United States Patent
Wenclik et al.

(10) Patent No.: US 9,523,282 B2
(45) Date of Patent: Dec. 20, 2016

(54) START-UP METHOD FOR A WIND TURBINE AND A CONTROL ASSEMBLY

(71) Applicant: General Electric Company, Schenectady, NY (US)

(72) Inventors: Mateusz Pawel Wenclik, Salzbergen (DE); David Charles Korim, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 713 days.

(21) Appl. No.: 13/783,498

(22) Filed: Mar. 4, 2013

(65) Prior Publication Data
US 2014/0248118 A1    Sep. 4, 2014

(51) Int. Cl.
*F03D 7/00* (2006.01)
*F01D 7/00* (2006.01)
*F03D 7/02* (2006.01)

(52) U.S. Cl.
CPC .............. *F01D 7/00* (2013.01); *F03D 7/026* (2013.01); *F05B 2260/98* (2013.01); *F05B 2270/00* (2013.01); *Y02E 10/723* (2013.01)

(58) Field of Classification Search
CPC .... F03D 7/0224; F03D 7/026; F03D 11/0008; F05B 2260/98
See application file for complete search history.

(56) References Cited

U.S. PATENT DOCUMENTS

| | | | |
|---|---|---|---|
| 4,006,925 A * | 2/1977 | Scherer | F03D 7/0224 200/80 R |
| 4,364,708 A * | 12/1982 | David | F03D 1/0658 416/132 B |
| 7,244,097 B2 | 7/2007 | Hinz et al. | |
| 7,699,584 B2 | 4/2010 | Mollhagen | |
| 8,887,868 B2 * | 11/2014 | Takayanagi | F03D 7/026 184/4 |
| 8,997,934 B2 * | 4/2015 | Nielsen | F03D 11/0008 184/4 |
| 2012/0041609 A1* | 2/2012 | Xin | F03D 7/0224 700/287 |
| 2013/0343888 A1* | 12/2013 | Nielsen | F03D 11/0008 416/1 |

FOREIGN PATENT DOCUMENTS

DE           10129089 B4     8/2006

* cited by examiner

*Primary Examiner* — Charles Freay
*Assistant Examiner* — Christopher Bobish
(74) *Attorney, Agent, or Firm* — GE Global Patent Operation; Douglas D. Zhang

(57) ABSTRACT

A method for starting-up a wind turbine having a rotor with at least one rotor blade is provided. The method includes rotating the at least one rotor blade towards a main operating position using a pitch drive system including a pitch bearing supporting the at least one rotor blade, and a pitch-driving pinion meshing with the pitch bearing; and activating a pump to feed a lubricant to a lubrication pinion meshing with one of the pitch bearing and the pitch-driving pinion before the at least one rotor blade reaches the main operating position so that the lubricant is mainly transferred to a load portion of the pitch bearing and/or a load portion of the pitch-driving pinion. Further, a control assembly for use with the wind turbine is provided.

18 Claims, 6 Drawing Sheets

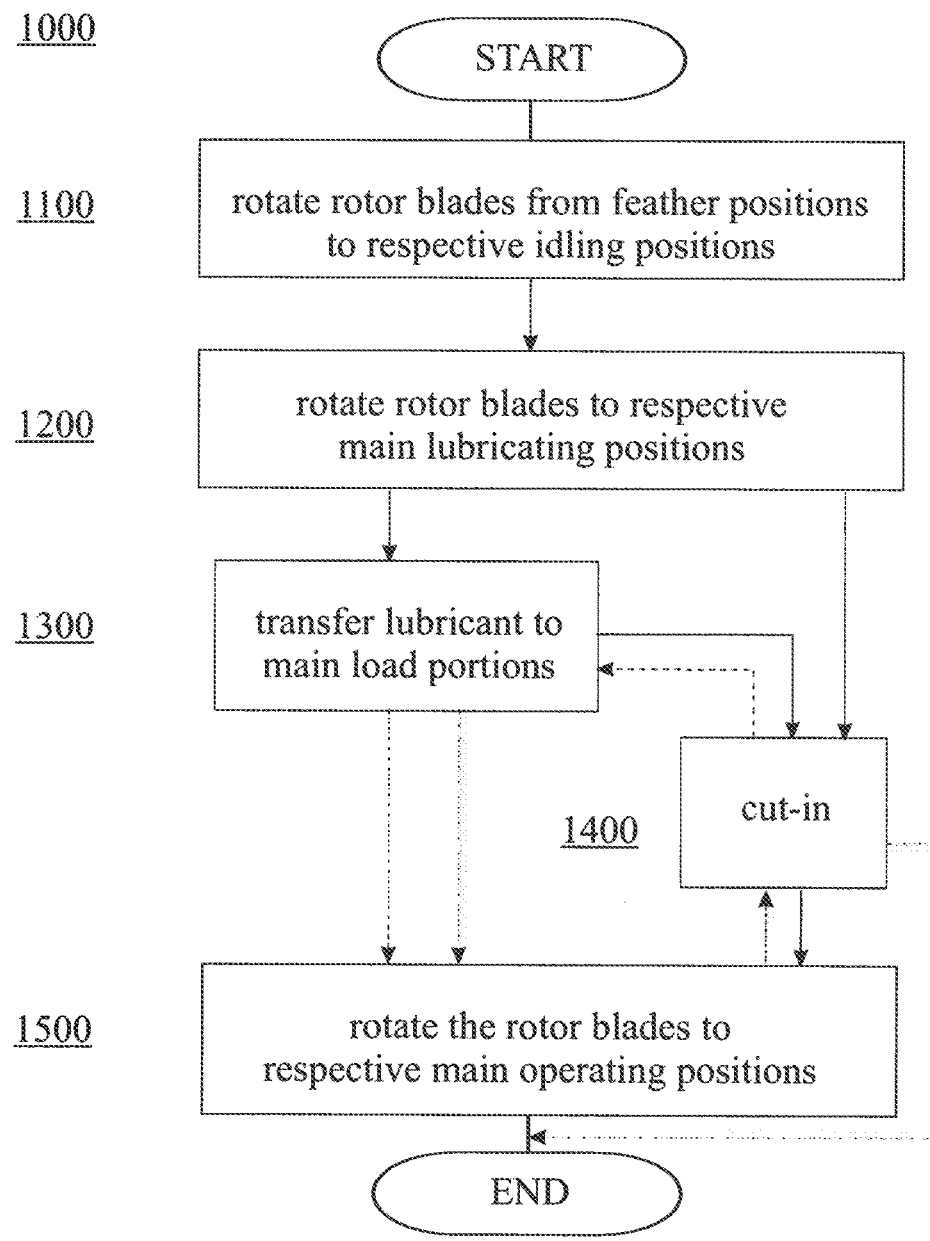

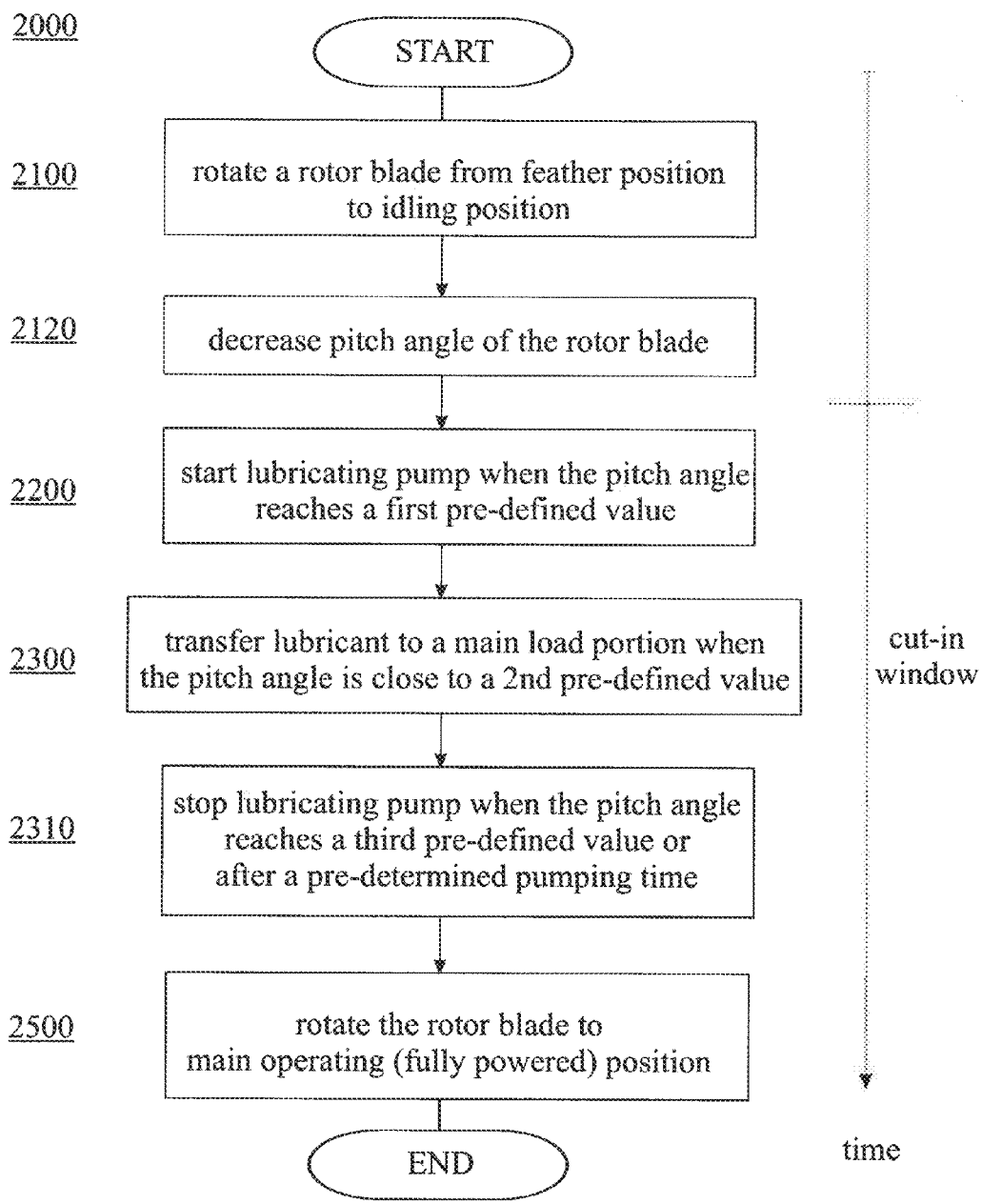

START-UP METHOD FOR A WIND TURBINE AND A CONTROL ASSEMBLY

BACKGROUND OF THE INVENTION

The subject matter described herein relates generally to start-up methods and systems for start-up of a wind turbine.

Generally, a wind turbine includes a turbine that has a rotor that includes a rotatable hub assembly having multiple blades. The blades, which are also referred to as rotor blades, transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Each of the rotor blades is typically rotatably mounted on the hub using a respective pitch-drive system having a gearing supporting the rotor blade. Accordingly, the rotor blades can be adjusted relative to the wind direction. During partial load operation of the wind turbine, the rotor blades are typically in a fully powered position which may correspond to respective fully powered pitch angle values of 0° of the pitch-drive systems while pitch angle values of 90° may correspond to respective feathered positions. If the wind speed exceeds its rated value, the pitch angles of the rotor blades are typically varied so that the wind turbine can operate with fully rated power. On average, the pitch-drive systems typically operates the rotor blades in or close to the fully powered positions for more than about 50%, more than about 60% or even more than about 70% of the operating time. Accordingly, the fully powered positions of the rotor blades typically correspond to main operating positions in which and/or close to which the risk of gear wear of corresponding load portions of the pitch-drive systems is increased.

The load portions may be lubricated during a non-operating phase of the wind turbine, for example during a regular maintenance or in the absence of high enough wind. However, production phase may be long posing a risk of gear damage due to a non-surviving lubricating film. On the other hand, short maintenance intervals ensuring sufficient lubrication result in production losses and, thus, increase costs. This is of particular importance for coastal or offshore wind turbines.

It would therefore be desirable to provide systems and methods for improved lubrication of pitch drive systems.

BRIEF DESCRIPTION OF THE INVENTION

In one aspect, a method for starting-up a wind turbine having a rotor with at least one rotor blade is provided. The method includes rotating the at least one rotor blade towards a main operating position using a pitch drive system including a pitch bearing supporting the at least one rotor blade, and a pitch-driving pinion meshing with the pitch bearing; and activating a pump to feed a lubricant to a lubrication pinion meshing with one of the pitch bearing and the pitch-driving pinion before the at least one rotor blade reaches the main operating position so that the lubricant is mainly transferred to at least one of a load portion of the pitch bearing and a load portion of the pitch-driving pinion.

In one aspect, a method for starting-up a wind turbine having a rotor with at least one rotor blade and a pitch drive system coupled to the at least one rotor blade and configured to rotate the at least one rotor blade about a longitudinal axis of the at least one rotor blade is provided. The method includes rotating the at least one rotor blade from an idling position at least close to a main lubricating position in which a lubricating assembly is configured to transfer a lubricant to a portion of the pitch drive system, the load portion being exposed to mechanical loads when the at least one rotor blade is in a main operating position, transferring the lubricant to the portion of the pitch drive system while the at least one rotor blade is at least close to the main lubricating position, and rotating the at least one rotor blade into the main operating position In still another aspect, a control assembly for use with a wind turbine having a rotor including at least one rotor blade is provided. The control assembly includes a pitch drive system coupled to the at least one rotor blade, a lubricating assembly coupled to the pitch drive system, and a control system. The pitch drive system is adapted to rotate the at least one rotor blade about a longitudinal axis of the at least one rotor blade. The control system is communicatively coupled to the pitch drive system and the lubrication device, and configured to control rotating the at least one rotor blade from an idling position at least close to a main lubricating position in which the lubricating assembly is configured to transfer a lubricant to a load portion of the pitch drive system, the load portion being exposed to mechanical loads when the at least one rotor blade is in a main operating position. The control system is further configured to control transferring the lubricant to the load portion of the pitch drive system while the at least one rotor blade is at least close to the main lubricating position, and to rotate the at least one rotor blade into the main operating position.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein:

FIG. 7 illustrates a flow diagram of a method for operating a wind turbine according to an embodiment.

FIG. 8 illustrates a flow diagram of a method for operating a wind turbine according to an embodiment.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a start-up method for a wind turbine and a wind turbine control assembly which is configured to perform the start-up method. During starting-up, pitching is synchronized with lubricating the pitch drive system. Accordingly, lubricant may be applied to load portion of the pitch drive system and the overall energy production losses may be reduced.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "normal operation" intends to describe an operating mode of the wind turbine in which kinetic energy of wind is converted to electrical power.

Figure 1:
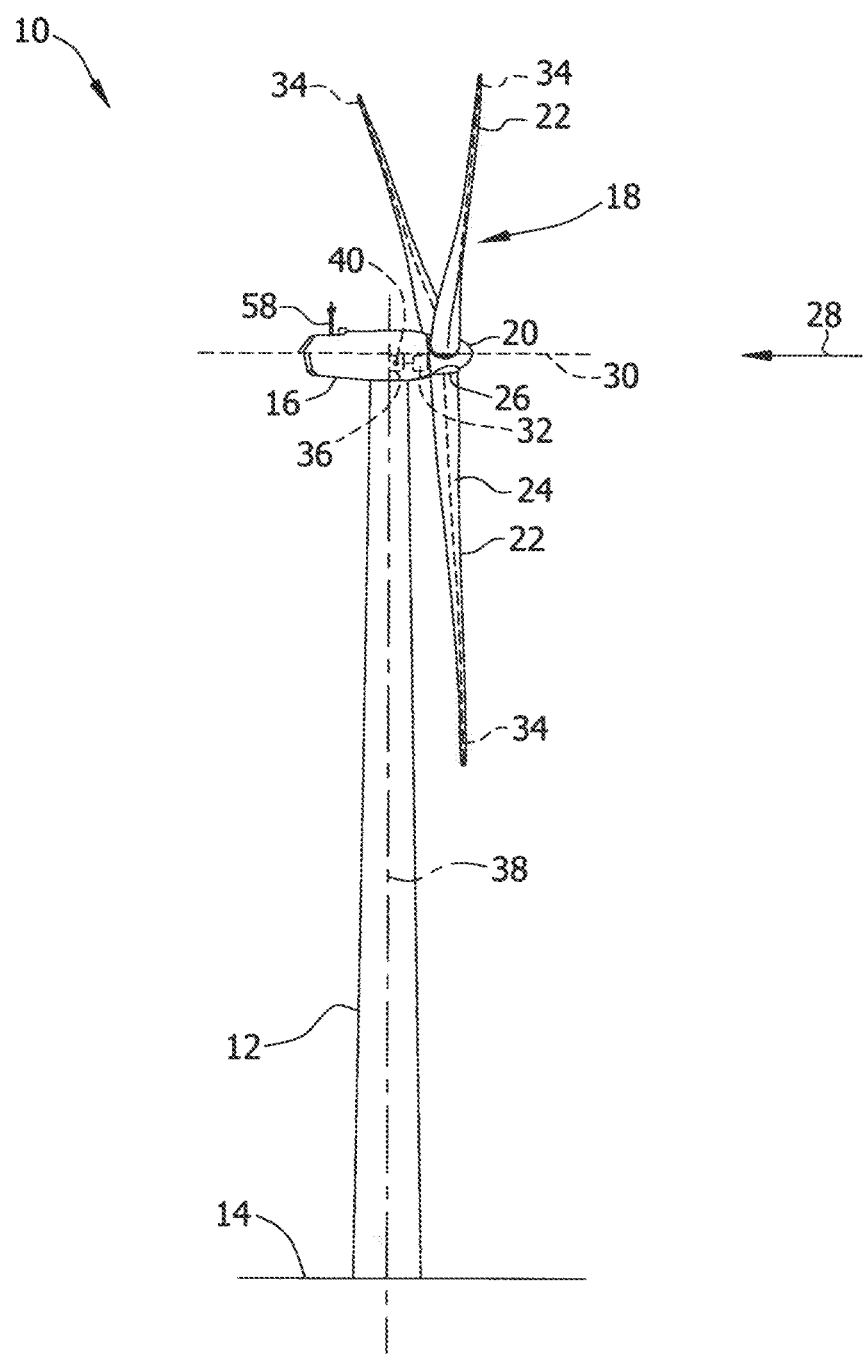
FIG. 1 is a perspective view of a portion of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18. In the following, modulating the blade pitch of the at least one rotor blade 22 along its pitch axis 34 is also referred to as pitching.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
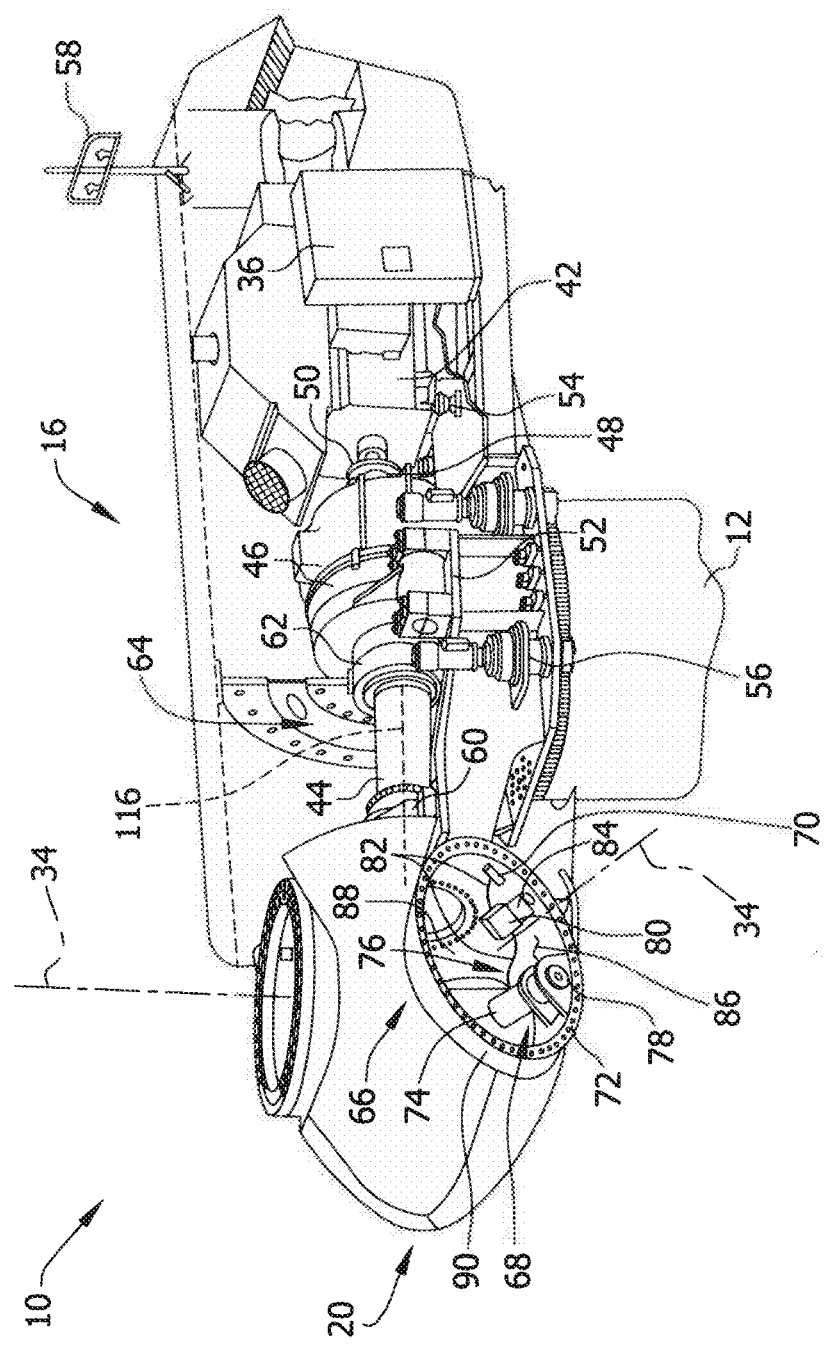
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 (shown in FIG. 1) that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34 which are also referred to as longitudinal axis. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Figure 3:
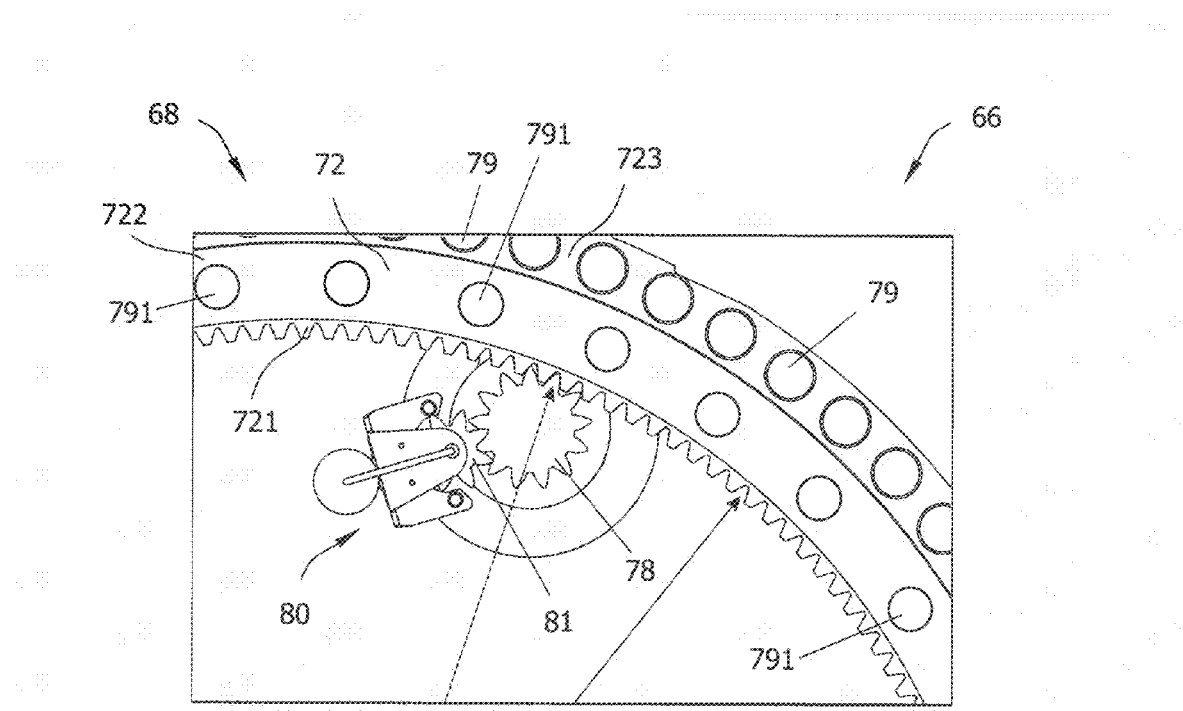
FIG. 3 is a schematic view of a pitch drive system and a lubricating assembly of a wind turbine according to an embodiment.

FIG. 3 is a schematic view of a pitch drive system 68 of a pitch assembly 66 and a lubricating device 80 of a wind turbine which is similar as explained above with regard to FIGS. 1, 2. Typically, the pitch assembly 66 includes a pitch drive system 68 for each of its rotor blades. For sake of clarity, pitch assembly 66 and methods for lubricating pitch assembly 66 are mainly explained with regard to one pitch drive systems 68. However, it goes without saying that lubricating is typically performed in parallel for all pitch drive systems 68 of pitch assembly 66.

In the exemplary embodiment, pitch drive systems 68 is implemented as an open tooth-wheel drive and includes a pitch bearing 72 which supports the rotor blade (not shown), and a pitch-driving pinion 78 meshing with a toothed gear rim 721 of an inner race 722 of the pitch bearing 72. The rotor blade is connected to borings 791 on the inner race 722 and the hub (not shown) is connected to an outer race 723 of the pitch bearing 72 via borings 79.

Unlike many of the other open tooth-wheel drives, the pitch bearing of the wind turbine is, during the predominant part of the operating period, in a defined main operating position which corresponds to a fully powered position and is indicated in FIG. 3 by the full arrow. For sake of clarity, the fully powered position is designated as 0° position.

The teeth of pitch-driving pinion 78 and gear rim 721 which are engaged with each other in the fully powered position are subject to high loads which are caused, in particular, by the occurring torsional forces of the rotor blade. Other teeth of pitch-driving pinion 78 and gear rim 721 are loaded in rare cases only, namely when the rotor blade is moved from the fully powered position into a different operating position at high wind speed. Thus, the teeth of pitch-driving pinion 78 and gear rim 721 which are engaged with each other in the fully powered position and a position which is substantially close to the fully powered position, respectively, form a main load portion of the pitch bearing, which corresponds to a main load portion of gear rim 721, and a main load portion of the pitch-driving pinion 78, respectively.

Typically, the main load portion of the pitch bearing is formed by at least one first tooth, typically by one to about three or four first teeth and the main load portion of the pitch-driving pinion 78 is formed by at least one second tooth, typically by one to about three or four second teeth.

The main load portions of the pitch bearing and the pitch-driving pinion 78 are subject to a high risk of corrosion since lubricant on the loaded tooth flanks may be displaced in the course of time so that the corresponding tooth flanks concerned will mesh with each other in a non-lubricated state after some time. Due to the high forces transferred, frictional corrosion can, thus, occur. The risk of corrosion may further be increased by climatic effects such as high humidity of the air and/or salt concentration of the air, in particular in coastal or offshore locations.

Accordingly, the main load portions require a comparatively frequent lubrication. However, lubricating the main load portions can hardly be done during normal operation of the wind turbine since they are engaged with each other most of the time. The main load portions of the pitch bearing and the pitch-driving pinion 78 of the wind turbine can be selectively lubricated if the rotor blade is moved from its main operating position into a lubricating position as indicated by the dashed arrow in FIG. 3 in which the main load portion of the pitch bearing and/or the main load portion of the pitch-driving pinion 78 are accessible for conventional lubricating methods.

In the exemplary embodiment, lubricant, typically a grease, may be transferred from lubrication pinion 81 meshing with the pitch-driving pinion 78 in the lubricating position by activating a pump, which, to feed the lubricant to lubrication pinion 81 and through lubrication pinion 81, respectively, so that the lubricant is transferred to the main load portion of the pitch-driving pinion 78. Typically, a lubricant reserve is transferred to the main load portion of the pitch-driving pinion 78 so that also the main load portion of gear rim 721 of the pitch bearing is sufficiently lubricated when the rotor blade is rotated into the main operating position.

In a further embodiment, lubricant, typically a grease, is transferred from a similar lubrication pinion meshing with the gear rim 721 of the pitch bearing in the lubricating position by activating a pump to feed the lubricant to the lubrication pinion and through the lubrication pinion, respectively, so that the lubricant is transferred to the main load portion of gear rim 721 of the pitch bearing. Again, a lubricant reserve is typically transferred to the main load portion of the gear rim 721 so that also the main load portion of the pitch-driving pinion 78 is sufficiently lubricated when the rotor blade is rotated into the man operating position.

According to an embodiment, lubricating the main load portions of the pitch-driving pinion 78 and the pitch bearing is initiated during starting-up the wind turbine. This typically includes rotating the rotor blade(s) towards a main operating position, typically from a feathered position of for example 90° or an idling position between the feathered position and the fully powered position, and activating a pump to feed the lubricant to the lubrication pinion 81 meshing with one of the pitch bearing 72 and the pitch-driving pinion 78 before the rotor blade reaches the main operating position so that the lubricant is selectively transferred to at least one of the load portion of the pitch bearing 72 and a load portion of the pitch-driving pinion 78. This is explained in more detail in the following.

Figure 4:
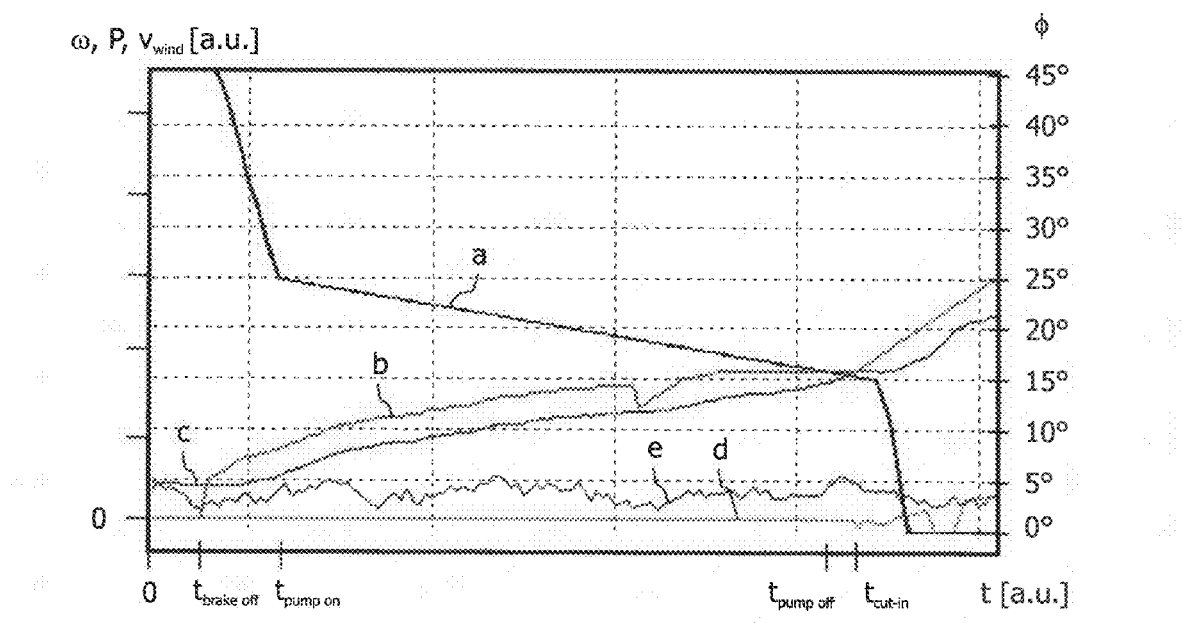
FIG. 4 illustrates parameters of a wind turbine during start-up including an initial period of power production of a wind turbine to an embodiment.

FIG. 4 illustrates simulated parameters of a wind turbine during start-up as function of time t assuming an external wind speed shown in curve e.

Typically, an operating cycle of a wind turbine begins with a system check. Thereafter, the yaw system may be activated while the rotor is braked and the rotor blades are in their feathered positions. When the wind speed is in a rated operating range, the wind turbine may be yawed to the wind and the wind turbine may be started-up.

Start-up may begin with pitching the rotor blades into respective idling positions of for example about 60°. The rotor blade pitch angle $\phi$ is represented by curve a in FIG. 4. However, only pitch angle values below the idling position are shown in FIG. 4 for sake of clarity. At a time $t_{break\ off}$ the rotor brake is released and the rotor starts to rotate with a rotor speed $\omega$ as illustrated by curve c. Depending on the wind speed (curve e), the rotor speed $\omega$ increases and may follow a set-point for the rotor speed $\omega$ illustrated by curve b.

According to an embodiment, a pump is activated at a later time $t_{pump\ on}$ when the rotor blade(s) reaches a main lubricating position in which a lubricating device, typically a lubricating pinion, connected to the pump is configured to transfer a lubricant to a main load portion of the pitch drive system, typically a main load portion of a gear rim of the pitch bearing or a main load portion of a pitch-driving pinion. The lubricating assembly of the wind turbine may include one pump and individual lubricating device which are connected to the pump, for each rotor blade or a pump and a connected lubricating device for each rotor blade.

Typically, all rotor blades of the rotor are pitched simultaneously. Accordingly, all rotor blades typically reach their respective main lubricating position at the same time and pumping of the lubricant is initiated at the same time $t_{pump\ on}$.

Now, the further decrease of the pitch angle $\phi$ is typically lowered or even stopped until a sufficient amount of lubricant is transferred to the main load portion of the pitch drive system at a later time $t_{pump\ off}$ where the pump is typically stopped.

The time interval between $t_{pump\ on}$ and $t_{pump\ off}$ is in the following also referred to as lubricating period. Within this interval, the pitch angle $\phi$ is typically only varied within a small lubricating range of typically not more than about 15°, for example in the exemplary range of about 10° shown in FIG. 4. Accordingly, the lubricant is mainly transferred or even only transferred the to the main load portion of the pitch drive system. This avoids that a too large amount of the lubricant is provided to less loaded portions of the pitch drive system. This reduces both costs and the risk that excess lubricant drips off.

In the exemplary embodiment, the averaged wind speed is comparatively low and the rotor (generator) reaches its rated cut-in speed at time somewhat after $t_{pump\ off}$.

Thereafter, the wind turbine begins to feed power into a grid at a cut-in time $t_{cut\ in}$. The electric power production is illustrated by curve d in FIG. 4

Figure 5:
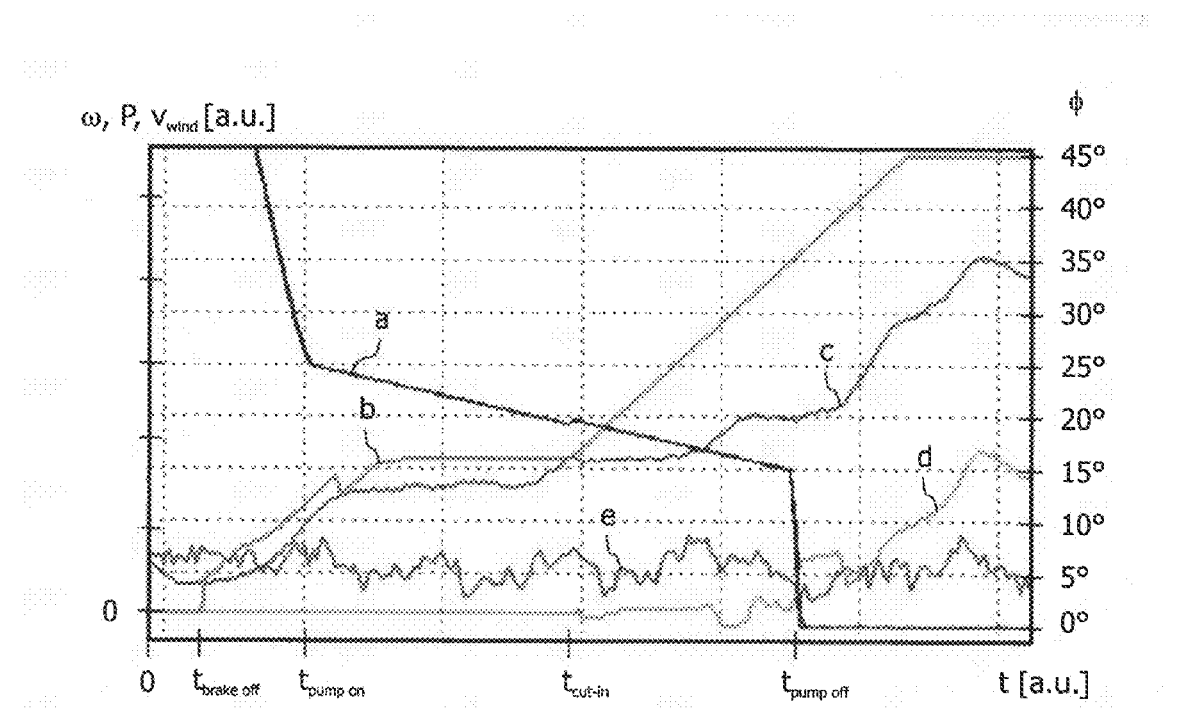
FIG. 5 illustrates parameters of a wind turbine during start-up including an initial period of power production of a wind turbine to another embodiment.

FIG. 5 illustrates simulated parameters of a wind turbine during start-up as function of time t. The curves a, b, c, d, and e in FIG. 5 also correspond to pitch angle $\phi$, rotor speed setpoint, actual rotor speed $\omega$, electric power production of the wind turbine generator and external wind speed, respectively. The start-up of the wind turbine is performed similar as explained with regard to FIG. 4. However, the rotor reaches its rated cut-in speed earlier than in FIG. 4 due to a higher average wind speed. Accordingly, electric power production sets in earlier and at a cut-in time $t_{cut\ in}$ which lies in the lubricating period $t_{pump\ off}$-$t_{pump\ on}$.

Figure 6:
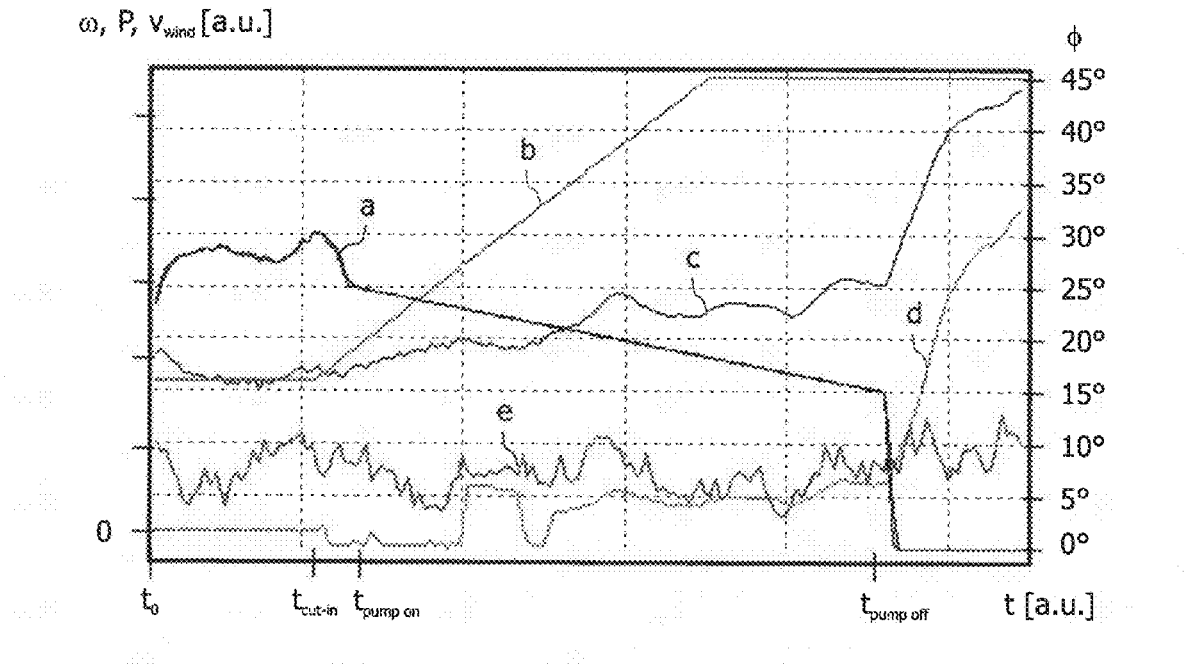
FIG. 6 illustrates parameters of a wind turbine during start-up including an initial period of power production of a wind turbine to still another embodiment.

FIG. 6 illustrates simulated parameters of a wind turbine during start-up as function of time t. The curves a, b, c, d, and e in FIG. 6 also correspond to pitch angle φ, rotor speed setpoint, actual rotor speed ω, electric power production of the wind turbine generator and external wind speed, respectively. The start-up of the wind turbine is performed similar as explained with regard to FIGS. 4, 5. However, the average wind speed is higher compared to FIG. 4 and the external wind is more turbulent. Under this condition, rotor speed increases faster after releasing the rotor break and the pitch angle φ is not kept long enough within the lubricating range prior to reaching cut-in condition. Accordingly, electric power production may be started prior to lubricating in the lubricating period $t_{pump\ off}$-$t_{pump\ on}$.

In the exemplary embodiments explained above with regard to FIGS. 4 to 6, the lubricating cycle is executed during wind turbine start-up. Lubricating the pitch drive systems is synchronized with the pitching activity to apply optimized amount of lubricant, typically grease, to a pre-defined load portions of the pitch drive systems. The synchronization is typically ensured by a wind turbine control system, for example a wind turbine PLC, controlling the pitch drives and the lubrication pumps (one or more). Wind turbine start-up begins normally. When a maximum lubricating pitch angle is reached the rotor blades may pause or at least decelerate and the pump(s) may be activated. Pumping may already start at a higher pitch angle, for example standard maximum lubricating pitch angle plus one full revolution of the pitch-drive pinion.

The lubricating period is typically set in such a way to allow the lubricant to reach the lubrication pinions. Subsequently, the rotor blades continue to pitch at a low rate. In so doing, lubricant gets applied to the pitch-driving pinion and eventually transferred to the pitch bearing gear or vice versa. Thus, gear wear may efficiently be avoided at the positions where the rotor blades spend most time during normal operation. As lubricating of the pitch-drive system(s) is performed during start-up, the overall power production of wind turbines may be increased.

According to an embodiment, minimum and maximum lubricating interval times are defined to further reduce energy production losses. Lubricating cycle can be executed after the minimum lubricating interval time. However, wind turbine will not be required to shut down just due to the lubricating cycle until the maximum lubricating interval time is reached.

Depending on wind condition, wind turbine cut-in can occur before (FIG. 6), during (FIG. 5) or after (FIG. 4) the lubricating period. After the lubricating period, rotor blades may be typically pitched into their main operating positions (0° in FIGS. 4 to 6).

During the lubrication period all vital turbine parameters are typically monitored by a wind turbine control system. Lubricating may be abandoned if a too large impact on wind turbine start-up is to be expected (e.g. rotor or generator speed is expected to become too low or too high). In such a case, the lubricating period is typically repeated during next wind turbine start-up.

To control the lubricating of the pitch-drive system(s), typically in a closed-loop manner, the wind turbine control system is communicatively coupled to the pitch-drive system(s) and the lubrication assembly, typically the pump(s). During start-up, the wind turbine control system controls: rotating the rotor blade(s) from idling position(s) at least close to a main lubricating position(s) in which the respective lubricating device is configured to transfer a lubricant to a main load portion of the pitch drive system, i.e. a portion which is exposed to mechanical loads when the respective rotor blade is in a main operating position; transferring the lubricant to the main load portion of the pitch drive system while the at least one rotor blade is at least close to the main lubricating position; and rotating the rotor blade(s) into the main operating position.

FIG. 7 illustrates a flow diagram of a method 1000 for starting-up a wind turbine as explained above with regard to FIGS. 1 to 3.

In a first block 1100, the rotor blades are rotated from respective feather positions to respective idling position using a respective pitch-drive system. In so doing the rotor blades are rotated towards their main operating positions.

Thereafter, the rotor break may be released.

In a subsequent block 1200, the rotor blades are rotated at least close to respective main lubricating position, i.e. further towards their main operating positions, in which a lubricating device is configured to transfer a lubricant to a main load portion of the pitch drive system. In a block 1200, a lubricant is transferred to the main load portion of the pitch drive system while the rotor blades remain at least close to their main lubricating positions.

In a subsequent block 1500, the rotor blades are rotated into their main operating positions.

Prior to block 1500, the wind turbine is cut-in and starts converting wind power into electric power in a block 1400. As explained above with regard to FIGS. 4 to 6, the wind turbine may, depending on external wind condition, be cut-in at different times. Further, block 1300 may be aborted if the speed of the rotor (generator) is expected to become too high or too low. All this is illustrated in FIG. 7 by different arrows representing different sequences of the method blocks.

Each pitch drive system typically includes a pitch bearing connected to the rotor blade and a pitch-driving pinion meshing with the pitch bearing. A second tooth of the pitch-driving pinion is engaged with a first tooth of the pitch bearing when the rotor blade is in the main operating position.

A lubricating assembly of the wind turbine typically includes as lubricating device a lubrication pinion meshing with one of the pitch bearing and the pitch-driving pinion. In block 1200, the lubricant is typically mainly transferred to or close to the first tooth or the second tooth.

Typically, the lubricating assembly further includes a pump which is connected to the lubrication pinion(s) and may be activated before the rotor blade reaches the main lubricating position(s), for example when the respective rotor blade reaches a pumping position having an angular distance to the main lubricating position corresponding to a full rotation of the pitch-driving pinion.

Typically, the rotor blades are not rotated back into the feather positions prior to rotating into their main operating positions.

Method 1000 is typically repeated after operating the wind turbine in partial load regime for a pre-defined operating time.

FIG. 8 illustrates a flow diagram of a method 2000 for starting-up a wind turbine as explained above with regard to FIGS. 1 to 3.

In a first block 2100, the rotor blades are rotated from respective feather positions to respective idling positions using a respective pitch-drive system. Thereafter, the rotor break may be released.

In a subsequent block 2120, the pitch angles of the rotor blades are further decreased, i.e. the rotor blades are rotated towards respective main operating positions.

When the pitch angles reach a first pre-defined value, one or more lubricating pumps are started to pump lubricant to one lubricating device for each pitch-drive system in a subsequent block 2200.

The pitch angles may be maintained at the first pre-defined value for a pre-defined time period to ensure that enough lubricant reaches the lubrication device.

Thereafter, the pitch angles of the rotor blades may be further decreased. Depending on wind condition, rotor speed and amount of lubricant that is still to be pumped, the pitch angles of the rotor blades are typically decreased at a lower rate.

When the pitch-angles reaches a second pre-defined value which is lower than the first pre-defined value, the lubricant is transferred to main load portions of the pitch drive systems in a block 2300.

A difference between the first pre-defined value and the second pre-defined value may substantially correspond to a full rotation of a pitch-driving pinion forming the lubricating device.

Thereafter, the pitch angles of the rotor blades may be further decreased. When the pitch-angles reaches a third pre-defined value which is lower than the second pre-defined value or when a sufficient amount of lubricant is pumped, the one or more lubricating pumps are stopped in a subsequent block 2310. The second and third pre-defined value typically correspond to the highest value of the lubricating range and the lowest value of the lubricating range as explained above with regard to FIGS. 4 to 6.

In a subsequent block 2500, the rotor blades are rotated into their main operating positions.

Depending on the wind condition, cut-in of the wind turbine may take place at different times. This is illustrated in FIG. 8 by the right arrow.

Method 2000 is typically repeated after operating the wind turbine in partial load regime for a pre-defined operating time.

The above-described systems and methods facilitate lubricating the pitch drive system during start-up of the wind turbine. More specifically, lubricant may be applied selectively to load portion of the pitch drive system. Accordingly, additional lubricating period interrupting power production may be avoided. Thus, the overall energy production losses may be reduced.

Exemplary embodiments of systems and methods for starting-up a wind turbine are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for starting-up a wind turbine, the wind turbine comprising a rotor comprising at least one rotor blade, said method comprising:

rotating the at least one rotor blade towards a main operating position using a pitch drive system comprising a pitch bearing supporting the at least one rotor blade, and a pitch-driving pinion meshing with the pitch bearing;

activating a pump to feed a lubricant to a lubrication pinion meshing with one of the pitch bearing or the pitch-driving pinion before the at least one rotor blade reaches the main operating position so that the lubricant is selectively transferred to at least one of a load portion of the pitch bearing or a load portion of the pitch-driving pinion;

defining a pitch-value angular range of the at least one rotor blade corresponding to the load portion of the pitch bearing or the pitch-driving pinion;

wherein activation of the pump is started at a first pre-defined pitch angle prior to the at least one rotor blade reaching the pitch-value angular range, and maintaining pitch of the at least one rotor blade at substantially the first pre-defined pitch angle for a time sufficient for the lubricant to reach the lubrication pinion; and thereafter, pitching of the at least one rotor blade to a second pre-defined pitch angle that corresponds to an upper value of the pitch-value range, wherein a pitch difference between the first and second pre-defined pitch angles is computed to allow lubricant delivered to the lubrication pinion to transfer to the load portion of the pitch bearing or the pitch-driving pinion.

2. The method according to claim 1, wherein the main operating position is a fully powered position of the at least one rotor blade.

3. The method according to claim 1, wherein the pitch bearing comprises a first tooth, wherein the pitch-driving pinion comprises a second tooth which is engaged with the first tooth when the at least one rotor blade is in the main operating position, and wherein the second pre-defined value which corresponds to a pitch-angle value of the at least one rotor blade at which the lubrication pinion is adapted to transfer the lubricant to one of the first tooth or the second tooth.

4. The method according to claim 3, wherein a difference between the first pre-defined value and the second pre-defined value substantially corresponds to a full rotation of the pitch-driving pinion.

5. The method according to claim 1, wherein an absolute value of a pitching speed of the at least one rotor blade is reduced from an initial pitching speed after the pitch-angle has reached the first pre-defined value.

6. The method according to claim 1, further comprising at least one of:

monitoring a speed of the rotor of the wind turbine; or stopping the pump when the speed of the rotor is outside a desired range.

7. The method according to claim 1, wherein the wind turbine further comprises a generator which is configured to feed electrical power to a grid, and wherein the pump is activated prior to feeding electric power to the grid.

8. The method according to claim 1, further comprising at least one of:
rotating the at least one rotor blade into the main operating position;
feeding electric power to a grid after activating the pump; or
stopping the pump before the at least one rotor blade is in the main operating position.

9. The method according to claim 1, wherein the method is activated after a pre-defined normal operating time of the wind turbine.

10. A method for starting-up a wind turbine, the wind turbine comprising a rotor comprising at least one rotor blade, and a pitch drive system coupled to the at least one rotor blade and configured to rotate the at least one rotor blade about a longitudinal axis of the at least one rotor blade, said method comprising:
rotating the at least one rotor blade from an idling position at least close to a first predefined pitch position before a main lubricating position in which a lubricating assembly is configured to transfer a lubricant to a portion of the pitch drive system which is exposed to mechanical loads when the at least one rotor blade is in a main operating position;
maintaining the at least one rotor blade at substantially the first predefined pitch position while transferring the lubricant to the portion of the pitch drive system while lubricating assembly prior to the at least one rotor blade is at least close to reaching the main lubricating position; and;
thereafter, transferring the lubricant from the lubricating assembly to the pitch drive system while controlling pitch speed of the at least one rotor blade so that a defined amount of the lubricant is transferred prior to the at least one rotor blade pitching to the main operating position: and
rotating the at least one rotor blade into the main operating position.

11. The method according to claim 10, wherein the pitch-system comprises a pitch bearing connected to the at least one rotor blade and comprising a first tooth, a pitch-driving pinion meshing with the pitch bearing and comprising a second tooth which is engaged with the first tooth when the at least one rotor blade is in the main operating position, wherein the lubricating assembly comprises a lubrication pinion meshing with one of the pitch bearing or the pitch-driving pinion, and wherein one of the first tooth or the second tooth forms the portion of the pitch drive system to which the lubricant is transferred.

12. The method according to claim 11, wherein the lubricating assembly further comprises a pump connected to the lubrication pinion, and wherein the pump is activated at the first predefined pitch position of the at least one rotor blade.

13. The method according to claim 12, wherein the first predefined pitch position has an angular distance to the main lubricating position, the angular distance substantially corresponding to a full rotation of the pitch-driving pinion.

14. The method according to claim 12, wherein the wind turbine further comprises a generator connected to the rotor, further comprising at least one of:
rotating, prior to rotating the at least one rotor blade at least close to the main lubricating position, the rotor blade from a feather position into the idling position;
connecting the generator and a grid;
feeding electric power from the generator into the grid; or
stopping the pump after connecting the generator.

15. The method according to claim 10, wherein the at least one rotor blade is not rotated back into a feather position prior to rotating the at least one rotor blade into the main operating position.

16. The method according to claim 10, wherein the method is repeated after operating the wind turbine with at least one rotor blade substantially at the main operating position for a pre-defined operating time.

17. A control assembly for use with a wind turbine, the wind turbine comprising a rotor including at least one rotor blade, said control assembly comprising:
a pitch drive system coupled to the at least one rotor blade, the pitch drive system being adapted to rotate the at least one rotor blade about a longitudinal axis of the at least one rotor blade;
a lubricating assembly coupled to the pitch drive system; and,
a control system being communicatively coupled to said pitch drive system and the lubrication assembly, said control system being configured to control:
rotating the at least one rotor blade from an idling position to a first predefined pitch position before at least close to a main lubricating position in which the lubricating assembly is configured to transfer a lubricant to a portion of the pitch drive system which is exposed to mechanical loads when the at least one rotor blade is in a main operating position;
maintaining the at least one rotor blade at substantially the first predefined pitch position while transferring the lubricant to the portion of the pitch drive system while lubricating assembly prior to the at least one rotor blade is at least close to reaching the main lubricating position; and;
thereafter, transferring the lubricant from the lubricating assembly to the pitch drive system while controlling pitch speed of the at least one rotor blade so that a defined amount of the lubricant is transferred prior to the at least one rotor blade pitching to the main operating position: and
rotating the at least one rotor blade into the main operating position.

18. The control assembly according to claim 17, wherein the pitch-system comprises a pitch bearing connected to the at least one rotor blade and comprising a first tooth, a pitch-driving pinion meshing with the pitch bearing and comprising a second tooth which is engaged with the first tooth when the at least one rotor blade is in the main operating position, wherein the lubricating assembly comprises a lubrication pinion meshing with one of the pitch bearing or the pitch-driving pinion, and a pump connected to the lubrication pinion, and wherein one of the first tooth or the second tooth forms the portion of the pitch drive system to which the lubricant is to be transferred.

* * * * *

UNITED STATES PATENT AND TRADEMARK OFFICE
CERTIFICATE OF CORRECTION

| | | |
|---|---|---|
| PATENT NO. | : 9,523,282 B2 | |
| APPLICATION NO. | : 13/783498 | |
| DATED | : December 20, 2016 | |
| INVENTOR(S) | : Wenclik et al. | |

It is certified that error appears in the above-identified patent and that said Letters Patent is hereby corrected as shown below:

In the Specification

In Column 10, Line 22, delete "block 1200," and insert -- block 1300, --, therefor.

In the Claims

In Column 13, Line 24, in Claim 10, delete "at least close to a" and insert -- to a --, therefor.

In Column 13, Line 32, in Claim 10, delete "to the portion of the pitch drive system while" and insert -- to the --, therefor.

In Column 13, Line 34, in Claim 10, delete "is at least close to reaching" and insert -- reaching --, therefor.

In Column 13, Lines 34-35, in Claim 10, delete "position; and;" and insert -- position; --, therefor.

In Column 13, Line 41, in Claim 10, delete "position: and" and insert -- position; and --, therefor.

In Column 14, Lines 30-31, in Claim 17, delete "at least close to a" and insert -- a --, therefor.

In Column 14, Line 38, in Claim 17, delete "to the portion of the pitch drive system while" and insert -- to the --, therefor.

In Column 14, Line 40, in Claim 17, delete "is at least close to reaching" and insert -- reaching --, therefor.

In Column 14, Lines 40-41, in Claim 17, delete "position; and;" and insert -- position; --, therefor.

In Column 14, Line 47, in Claim 17, delete "position: and" and insert -- position; and --, therefor.

Signed and Sealed this
Twenty-eighth Day of March, 2017

Michelle K. Lee
*Director of the United States Patent and Trademark Office*